UNITED STATES PATENT OFFICE.

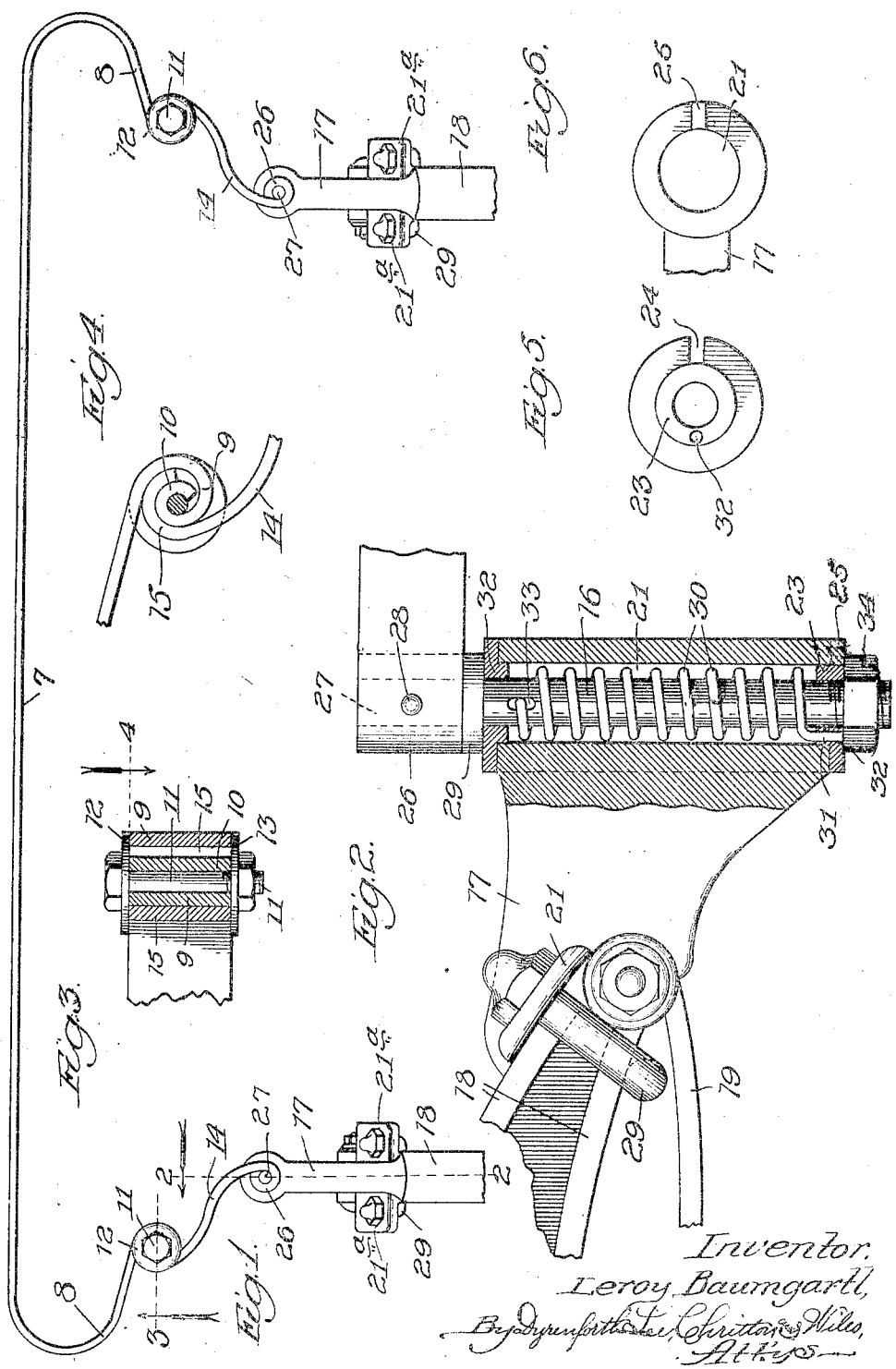

LEROY BAUMGARTL, OF CHICAGO, ILLINOIS.

AUTOMOBILE-BUMPER.

1,346,478.

Specification of Letters Patent.   Patented July 13, 1920.

Application filed May 6, 1920. Serial No. 379,240.

*To all whom it may concern:*

Be it known that I, LEROY BAUMGARTL, a citizen of the United States, residing at Chicago, in the county of Cook and State of Illinois, have invented a new and useful Improvement in Automobile-Bumpers, of which the following is a specification.

My primary object is to provide a novel, simple and comparatively economical construction of bumper which will be durable and operate in a highly satisfactory manner to protect the automobile against impacts which would otherwise more or less seriously damage or impair it.

Referring to the accompanying drawing:—

Figure 1 is a plan view of the front end of an automobile shown as equipped with a bumper constructed in accordance with my invention. Fig. 2 is an enlarged broken section taken at the line 2—2 on Fig. 1 and viewed in the direction of the arrow. Fig. 3 is a section taken at the line 3 on Fig. 1 and viewed in the direction of the arrow. Fig. 4 is a section taken at the line 4 on Fig. 3 and viewed in the direction of the arrow. Fig. 5 is a plan view of a lock washer employed; and Fig. 6, a bottom view of one of the similar brackets through the medium of which the bumper is supported on the automobile.

In the particular illustrated embodiment of my invention the bumper is formed of a bar 7 which in the positioning of the bumper on an automobile extends crosswise thereof, this bar being preferably formed of spring steel and presenting the rearwardly and inwardly curved portions 8 which are bent into the form of an open coil as represented at 9 and afford an eye-portion 10 on each end of the bar 7 through which pins 11, each shown as in the form of a bolt, extend, washers 12 and 13 being preferably interposed between the eye-portions 10 and the heads and nuts of the bolts. The cross-bar 7 is supported through the medium of arms 14 shown as formed of strap metal, with their outer ends bent into curved form as represented at 15 at which portions they extend into the spaces between the adjacent portions of coils 9 and conformingly fit therein to afford a pivotal joint between the arms 14 and the portions 8 of the cross-bar 7. The inner ends of the arms 14 are pivotally connected, upon upright axes, on the automobile. In the particular construction illustrated this is effected through the medium of spindles 16 journaled in the outer ends of brackets 17 rigidly secured to the outer ends of the parts, represented at 18, of the automobile, to which the front ends of the front springs 19 are connected, the means shown for securing these brackets in place comprising U bolts 20 which embrace the portions 18 and lateral extensions 21ª of the brackets. The spindles 16 extend through apertures 21 in the outer ends of the brackets, the journal connection of these spindles with the brackets being at washers 22 and 23 located at the upper and lower ends of each of the openings 21 and slightly set into the latter as shown, each washer 23 containing a slot 24 into which a depending lug 25 on the bracket 17 extends to hold this washer against rotating. The arms 14 at their inner ends are bent to form the eye portions 26 at which they surround the upper, reduced, ends of the respective spindles 16 and to which they are pinned as indicated at 28, the spindles 16 being provided below the arms 14 with annular flanged portions 29 against the upper surface of which the bars 14 extend edgewise. Each of the spindles 16 is surrounded by a coil spring 30 which is secured at its lower end indicated at 31, to the washer 23 as by positioning it in an opening 32 in the washer thereby holding this end of the spring stationary, the upper end of the spring extending into a slot 33 in the spindle. The spindles 16 are held against upward displacement by nuts 34 screwed upon their lower threaded ends. The construction and arrangement of the springs 30 as shown, is such as to cause them to yieldingly swing the arms 14 at their outer ends toward the center of the automobile.

It will be readily understood from the foregoing that impact against the cross-bar 7 will operate to cause one, or both, of the arms 14 to swing outwardly at their pivotal connection, or connections, as the case may be, with the brackets 17 against the resistance of the springs coöperating therewith, depending upon the point at which the impact is delivered against the cross-bar, the cushioning action afforded by the spring, or springs as the case may be, being augmented where the cross-bar 7 is of springy material and serving to very effectually cushion the blow. Where the cross-bar 7 is impacted toward one end, this end of the bumper structure will yield to an extent, relative to its other end, depending upon how close to the end of the cross-bar the blow is delivered, the cross-bar under such conditions assuming an inclined position relative to the transverse axes of the automobile and thereby serving to deflect the blow, with the manifest advantage, the double-jointed construction of the bumper at its opposite ends serving to cause the bumper to function in the respect just stated in a highly desirable manner.

While I have illustrated and described a particular construction embodying my invention, I do not wish to be understood as intending to limit it thereto as the same may be variously modified and altered without departing from the spirit of the invention.

What I claim as new and desire to secure by Letters Patent, is:

1. In combination with an automobile, a bumper formed of a cross-bar, arms pivotally supported on the automobile in spaced relation and pivotally connected at their outer ends with the ends of said cross-bar, and spring means operatively engaging said arms and operating to yieldingly resist swinging of said arms under impact against said cross-bar.

2. In combination with an automobile, a bumper formed of a resilient cross-bar, arms pivotally supported on the automobile in spaced relation and pivotally connected at their outer ends with the ends of said cross-bar, and spring means operatively engaging said arms and operating to yieldingly resist swinging of said arms under impact against said cross-bar.

3. In combination with an automobile, a bumper formed of a cross-bar and presenting at its ends inwardly-extending resilient portions, arms pivotally supported on the automobile in spaced relation and pivotally connected at their outer ends with the ends of the said resilient portions of said cross-bar, and spring means operatively engaging said arms and operating to yieldingly resist swinging of said arms under impact against said cross-bar.

4. In combination with an automobile, a bumper formed of a cross-bar, arms pivotally supported on the automobile in spaced relation and pivotally connected at their outer ends with the ends of said cross-bar, and spring means operatively engaging said arms and exerting a yielding force thereon tending to swing them at their outer ends toward the center of the automobile.

5. In combination with an automobile, a bumper formed of a cross-bar, arms pivotally supported on the automobile in spaced relation and pivotally connected at their outer ends with the ends of said cross-bar, the parts being so constructed and arranged that in the normal condition of the bumper the arms extend at their outer ends in a laterally outward direction, and spring means operatively engaging said arms and operating to yieldingly resist swinging of said arms under impact against said cross-bar.

6. In combination with an automobile, a cross-bar, spindles journaled in spaced relation at an end of the automobile, arms connected with said spindles and pivotally connected at their outer ends with the ends of said cross-bar, and spring means operatively engaging said arms and operating to yieldingly resist swinging of said arms under impact against said cross-bar.

7. In combination with an automobile, a cross-bar, spindles journaled in spaced relation at an end of the automobile, arms connected with said spindles and pivotally connected at their outer ends with the ends of the cross-bar, and springs operatively engaging said spindles and operating to yieldingly resist swinging of said arms under impact against said cross-bar.

8. In combination with an automobile, a cross-bar, spindles journaled in spaced relation at the end of the automobile, arms connected with said spindles and pivotally connected at their outer ends with the ends of cross-bar, and spring means surrounding said spindles and operating to yieldingly resist swinging of said arms under impact against said cross-bar.

9. In combination with an automobile, a bumper formed of a cross-bar, arms pivotally supported on the automobile in spaced relation and pivotally connected at their outer ends with the ends of said cross-bar, and spring means operatively engaging said arms and exerting a yielding force thereon tending to swing them at their outer ends in opposite directions.

LEROY BAUMGARTL.